US010595381B2

(12) United States Patent
Marinus et al.

(10) Patent No.: US 10,595,381 B2
(45) Date of Patent: Mar. 17, 2020

(54) CONTROLLING POWER USAGE IN APPLIANCES

(71) Applicant: SIGNIFY HOLDING B.V., Eindhoven (NL)

(72) Inventors: Antonius Adrianus Maria Marinus, Eindhoven (NL); Peter Deixler, Eindhoven (NL); Paul Theodorus Jacobus Boonen, Eindhoven (NL); Harald Josef Gunther Radermacher, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 327 days.

(21) Appl. No.: 15/519,178

(22) PCT Filed: Oct. 12, 2015

(86) PCT No.: PCT/EP2015/073593
§ 371 (c)(1),
(2) Date: Apr. 14, 2017

(87) PCT Pub. No.: WO2016/062574
PCT Pub. Date: Apr. 28, 2016

(65) Prior Publication Data
US 2017/0244249 A1    Aug. 24, 2017

(30) Foreign Application Priority Data

Oct. 24, 2014 (EP) .................................... 14190335

(51) Int. Cl.
*H05B 37/02* (2006.01)

(52) U.S. Cl.
CPC ..... *H05B 37/0245* (2013.01); *H05B 37/0272* (2013.01); *H05B 37/0227* (2013.01)

(58) Field of Classification Search
CPC ........................................ H05B 37/0245–0272
See application file for complete search history.

(56) References Cited

U.S. PATENT DOCUMENTS

| 7,994,723 B2 * | 8/2011 | Budde ................ H05B 37/0263 315/88 |
| 2008/0088180 A1 | 4/2008 | Cash et al. |

(Continued)

FOREIGN PATENT DOCUMENTS

| CN | 103209526 A | 7/2013 |
| CN | 103718478 A | 4/2014 |

(Continued)

*Primary Examiner* — Rexford N Barnie
*Assistant Examiner* — David A Shiao
(74) *Attorney, Agent, or Firm* — Daniel J. Piotrowski

(57) ABSTRACT

An appliance unit (3) is for electrical connection in series to a control unit (1) and to a power supply via the control unit (1). The appliance unit (3) comprises an appliance module comprising at least one controllable light generating module (23) and/or at least one controllable auxiliary module (25) for performing functionality other than light generating, and a control module (27) for negotiating a power mode for the appliance unit (3) with the control unit (1). The appliance module is controlled based on the power mode. A bypass module (21) is able to pass current through the appliance unit (3), such that the bypass module (21) is configured to pass a current to enable the control unit (1) to be powered separately from any current passed by the at least one controllable light generating module (23) and the at least one controllable auxiliary module (25).

11 Claims, 10 Drawing Sheets

(56) References Cited

U.S. PATENT DOCUMENTS

| | | |
|---|---|---|
| 2008/0111501 A1 | 5/2008 | Dobbins et al. |
| 2008/0265685 A1* | 10/2008 | Blair ................. H05B 37/0272 |
| | | 307/141 |
| 2009/0160409 A1* | 6/2009 | Carmen ............... H02M 5/257 |
| | | 320/166 |
| 2010/0251157 A1 | 9/2010 | Wendt et al. |
| 2010/0270982 A1* | 10/2010 | Hausman, Jr. ........ H02M 5/293 |
| | | 320/166 |
| 2010/0283391 A1* | 11/2010 | Braunshtein ....... H05B 37/0263 |
| | | 315/127 |
| 2011/0210670 A1* | 9/2011 | Sauerlander ......... H05B 33/083 |
| | | 315/120 |
| 2012/0025717 A1 | 2/2012 | Klusmann et al. |
| 2012/0262074 A1 | 10/2012 | Wang et al. |
| 2013/0178994 A1 | 7/2013 | Valluri et al. |
| 2013/0200703 A1 | 8/2013 | Liao et al. |
| 2014/0001846 A1 | 1/2014 | Mosebrook et al. |
| 2014/0265880 A1* | 9/2014 | Taipale .............. H05B 37/0263 |
| | | 315/158 |

FOREIGN PATENT DOCUMENTS

| | | |
|---|---|---|
| JP | 2011029090 A | 2/2011 |
| JP | 2012508962 A | 4/2012 |
| JP | 2014127426 A | 7/2014 |
| JP | 2014130699 A | 7/2014 |
| KR | 2012008268 A | 7/2012 |
| WO | 2010055456 A | 5/2010 |

\* cited by examiner

21    Fig 3

CONTROLLING POWER USAGE IN APPLIANCES

CROSS-REFERENCE TO PRIOR APPLICATIONS

This application is the U.S. National Phase application under 35 U.S.C. § 371 of International Application No. PCT/EP2015/073593, filed on Oct. 12, 2015 which claims the benefit of European Patent Application No. 14190335.1, filed on Oct. 24, 2014. These applications are hereby incorporated by reference herein.

FIELD OF THE INVENTION

This invention is generally related to a method and apparatus for controlling power usage in appliances. Particularly, but not exclusively, the invention relates to a method and apparatus for controlling power usage by a radio-frequency controlled appliance unit.

BACKGROUND OF THE INVENTION

There are various types of appliance unit. This invention for example of interest for appliance units which incorporate lighting, such as LED lamps and LED luminaires but which can perform additional functions. Indeed, lamps and luminaires with wireless control functions, using an on-board radio modem, are entering the market. The invention can however be applied to other multi-function devices which do not include a light output, for example an appliance which includes a RF wireless communication system used to receive remote wireless control function for controlling the appliance.

Various functions such as acoustic functions, sensing functions, image capture and cooling or ventilation can be integrated into an appliance, such as an LED lamp or LED luminaire, or these functions can provided by 2-wire accessories inserted for instance in the wall-box as a replacement for legacy wall switches. The LED lamps and luminaires and 2-wire accessories can also house functionality which can be part of a larger system, e.g. heating, ventilation and air conditioning (HVAC) systems, load-shedding systems, and emergency and alarm security systems.

To operate in an effective and efficient way, the various different functions should be available independently. For example a presence sensor may be integrated into a light unit. To make full use of this functionality, the presence sensor needs to be controlled independently from the light unit for example so that it may be used for purposes other than for lighting even when the lighting is off, for example for security purposes.

For controlling light units such as LED lamps, control units are typically used. Often control units or control panels are located within a wall-box (for example flush-mounted) or a junction box in the ceiling or just placed on a ceiling in the office or placed by the installer into the luminaire, replacing legacy mechanical switches, electronic switches or phase-cut dimmers. Control units can also be mounted at junction boxes in the ceiling or in a cupboard, for example next to circuit breakers.

The control unit can also be equipped with various functions, for example integrated occupancy sensors; integrated room-temperature or $CO_2$ or moisture sensors; a backlight for an improved user interface display or other user interface means (e.g. illuminated touch buttons) and RF communication means, and these different functions need to be applied independently.

The control unit functionality is not limited to controlling the lighting system and other functions above, but it can include other functionality such as wall-box radios for listening to music, outlets for cell-phone battery charging or web based components which may require constant access to power.

The installation of these smart lighting assemblies should be available for retrofit solutions as well as for new installations. In the case of a retrofit solution, compatibility with existing 'double wire' wall boxes (also known as 2-wire wall boxes), where no neutral wire is present, is also of interest.

SUMMARY OF THE INVENTION

The above concern is addressed by the invention as defined by the claims.

According to a first aspect of the invention, there is provided an appliance unit for electrical connection in series to a control unit and to a power supply via the control unit, the appliance unit comprising: an appliance module comprising at least one controllable light generating module and/or at least one controllable auxiliary module for performing functionality other than light generating; and a control module for negotiating a power mode for the appliance module with the control unit, and controlling the appliance module based on the power mode; and a bypass module for passing current through the appliance unit, such that the bypass module is configured to pass a current to enable the control unit to be powered separately from any current passed by the appliance module.

The electrical connection in series may be a 2-wire connection. The 2-wire connection may be a connection where the appliance unit has at one 'input' power terminal a first connection wire and at the other 'output' power terminal a second connection wire. There may be an electrical pathway which is defined as passing from one terminal of the power supply, through the control unit and through the appliance unit ending at the other terminal of the power supply.

The appliance unit is able to be connected in series with a control unit, and the bypass module then allows a current to flow through the appliance unit even when the light generating module is not active. However, as described further below, the appliance unit is also able to be connected in parallel with a control unit, in which case the bypass function does not need to be used. Thus, the applicability of the appliance unit is not limited to series arrangements.

An appliance unit bypass current (or "pass through current") may be controlled by the control unit. Furthermore the appliance unit may provide a stable and low or defined impedance path to enable the control unit to be powered when in series with the appliance unit and even when the appliance unit is inactive. The bypass module may for example be a 'bleeder' circuit. The bypass module may be configured to provide a low or defined impedance to enable a current to pass through the appliance unit when the control unit supplies a voltage to the appliance unit less than a threshold voltage. Alternatively a time based activation (synchronous to the mains frequency) of the bypass module may be implemented. The bypass module may be configured to provide a high impedance to block current passing through the bypass module when the control unit supplies a voltage to the appliance unit greater than a threshold voltage. Alternatively a time based deactivation of the bypass module may be implemented.

The appliance module may for example comprise both a light unit (i.e. the at least one controllable light generating module) and an auxiliary device (i.e. the at least one controllable auxiliary module). Thus, the appliance module has a lighting function as well as an auxiliary function such as sensing or RF communication.

A power supply cycle for the power supply may be divided into at least two portions and the bypass module may be configured to pass current during the first portion of the power supply cycle and to block current during the second portion of the power supply cycle. The first portion of the power supply cycle may power the control unit and the second portion of the power supply cycle may power the appliance unit. The bypass module may be configured to pass a current during the first portion and to block current during the second portion. In this way the bypass module may then not use power which would be used by the appliance unit when the appliance unit is active or actively powered.

The appliance unit may be configured to receive wirelessly from the control unit a power mode command comprising a power mode, wherein the control module may be further configured to control the appliance module based on the received power mode command. The power mode information may be passed according to any suitable wireless protocol such as radio frequency or infra-red wireless protocols.

The at least one controllable auxiliary module may comprise a wireless transceiver configured to receive the power mode command from the control unit. Thus in some embodiments a power mode command may be used to independently activate or deactivate the transceiver, for example to conserve power when the appliance unit is placed in a very low power standby mode.

The appliance unit may be configured to receive from the control unit a power mode command comprising a power supply setting and adapt the bypass unit accordingly. Thus in some embodiments the command may be passed over the power supply connection or coupling. The power supply setting may be a voltage level value or a current level value. For example, when the transceiver is switched off it is not possible to pass a power mode over the wireless connection.

The control module may be configured to selectively control the transceiver based on whether the power supply voltage level value is greater than a threshold value.

The control module may be configured to selectively control the at least one controllable auxiliary module by detecting a power supply setting. Thus for example the wireless transceiver may be 'woken' up to enable further commands to be received based on whether the control unit supplies the appliance unit with a voltage greater than a defined or determined threshold voltage.

The appliance unit may be configured to receive from the control unit a power mode command comprising a power mode associated with a time period, wherein the control module may be configured to control the appliance module based on the power mode for the time period and revert to a further power mode following an expiry of the time period.

The power mode may be an appliance unit power mode (for example a lighting power mode). The power mode may be a control unit power mode.

According to a second aspect there is provided a control unit for electrical connection in series with a power supply and at least one appliance unit, the control unit comprising:

a control module for negotiating a power mode with the at least one appliance unit; at least one controllable auxiliary module for performing functionality other than negotiating the power mode; a supply regulator module for selectively supplying electrical power to the control module, the at least one controllable auxiliary module, and the at least one appliance unit, such that the supply regulator is configured to supply current to the at least one appliance unit separately from any current passed by the control module and the at least one controllable auxiliary module and furthermore wherein the control module is configured to control the at least one controllable auxiliary module and the supply regulator module based on the power mode. The electrical connection in series may be a 2-wire connection. The 2-wire connection may be a connection where the control unit has at one 'input' power terminal a first connection wire and at the other 'output' power terminal a second connection wire.

Thus the control unit may permit efficient power usage within appliance units comprising many different functional components which are connected in a series or 2-wire arrangement with the control unit. By providing current to the appliance unit separately from the current needed by the control module and the at least one controllable auxiliary module, the currents can effectively be independently controlled.

The control module may be further configured to control the at least one controllable light generating module of the appliance unit and the at least one controllable auxiliary module. The control module may further be configured to determine a power mode command for the control unit to enable the supply regulator module to selectively and independently activate and supply power. Thus in some embodiments the control unit may be configured to further control the power consumption of the control unit such that the power consumption of a control unit comprising many different modules can be effectively controlled. The supply regulator module may comprise a supply module controllable by the control module and configured to selectively supply electrical power to the control module and the at least one controllable auxiliary module. The power supply or current for the control unit may be controlled in an effective manner.

The supply regulator module may further comprise an operating module controllable by the control module and configured to selectively supply electrical power to the at least one appliance unit. In such embodiments the control unit may be configured to control the power or voltage supplied to the appliance unit separately from the power or voltage supplied to the control unit modules.

The supply regulator module may be configured to divide a power supply cycle for the power supply into at least two portions based on the power mode, the supply module may be configured to selectively supply electrical power from a first portion of the power supply cycle, and the operating module may be configured to selectively supply electrical power from a second portion of the power supply cycle. The first and second portions of the supply cycle may be based on the negotiated power mode. This may for example be achieved by phase dividing the power supply cycle. For example the first portion may be an interval from the zero crossing to a defined phase angle and the second portion may be an interval from the defined phase angle to the next zero crossing.

In such a manner the power supply may be efficiently divided to supply power to the appliance unit and the control unit.

The control module may be configured to generate at least one power mode command for negotiating a power mode with the at least one appliance unit, and the at least one controllable auxiliary module comprises a transceiver configured to transmit the at least one power mode command wirelessly to the appliance unit. In such a manner control of the appliance unit power may be controlled efficiently using a wireless coupling between the appliance unit and the control unit.

The control module may be configured to generate at least one power mode command for negotiating a power mode with the at least one appliance unit, wherein the supply regulator module is configured to output the power mode command as a power supply setting to be passed to the appliance unit. In such a manner the negotiation of the power mode may be performed without the need to wirelessly couple the appliance unit and the control unit.

The supply regulator module may be configured to determine a voltage drop across the appliance unit, and wherein the supply regulator module is further configured to selectively supply electrical power to the control module and the at least one controllable auxiliary module based on the determined voltage drop across the appliance unit indicating that the current passing through the appliance unit is less than the current required to supply electrical power to the control module and the at least one controllable auxiliary module.

The at least one controllable auxiliary module may be a controllable light generating module. For example a nightlight may be provided on the control unit in order to help the user find the wall switch during the night.

The control unit may be configured to determine a current limit for a supply of power for the control unit being exceeded during the first portion of the power supply cycle by one of: the control unit being configured to determine a voltage drop over the appliance unit during the first portion of the power supply cycle; the control unit being configured to determine information on the maximum current limit of an appliance unit for the first portion of the power supply cycle. In such embodiments the control unit may determine whether there is sufficient current and therefore power available during the first portion of the power supply cycle to power all of the components and functionality requested from the control panel.

The control unit may be further configured to generate a power mode command for the control unit such that the current limit for the control unit is not exceeded. In such embodiments the power mode command may be implemented to switch off/deactivate the power to some of the lower priority modules in order that higher priority modules may remain active and supplied with sufficient power to remain functional.

The control unit may be further configured to log as an event the determination of the current limit being exceeded. In these embodiments the log may be examined to determine whether any further system upgrades, such as increased current appliance units are required in order to allow the control unit to operate as desired.

The control unit may be further configured to report as an event the determination of the current limit being exceeded. In these embodiments the report may be used to suggest whether any further system upgrades, such as increased current appliance units are required in order to allow the control unit to operate as desired.

The control unit may be further configured to: generate and wirelessly transmit a first power mode command to activate appliance units within wireless range; identify a first set of appliance units which respond to the first power mode command; generate and transmit a second power mode command to deactivate appliance units electrically connected to the control unit; identify a second set of appliance units which remain in response with respect to the first power mode command; and generate a list of the difference between the first and second set of appliance units so to identify the appliance units which are wirelessly controllable and which are electrically connected to the control unit. In such embodiments the control unit may generate commissioning information which enables the control unit to control the appliance units which only are within the circuit and which are controllable (e.g. auto-grouping of all the 30 wireless lamps on a large chandelier into one "super" lamp). This for example identifies appliance units which may receive commands switching off appliance units which cannot then be re-activated using the power supply command examples shown herein. The information on how many of the connected lights are capable to respond to requests for power modes can be used to calculate how many mA bypass or pass through current (to enable the 2-wire controller) is requested from each of the appliance units (to divide the burden of the bypass module over multiple appliance units).

The power mode may be an appliance unit power mode. The power mode may be a control unit power mode. A lighting system may comprise: at least one appliance unit as described herein; and at least one control unit as described herein.

According to a third aspect there is provided a method for controlling an appliance unit in series electrical connection with a control unit and a power supply, the method comprising: negotiating a power mode with the control unit; controlling selectively and separately, based on the power mode, the supply of power from the power supply to an appliance module comprising at least one controllable light generating module and/or at least one auxiliary module for performing functionality other than generating light; and providing a bypass module for passing current through the appliance unit, such that the bypass module is configured to pass a current to enable the control unit to be powered separately from any current passed by the appliance module. In such embodiments the appliance unit power usage may be intelligently controlled by the control unit and the control unit provided with a suitable low impedance path within the appliance unit which is separate from the appliance module such that the control unit may be powered even when the appliance unit is operating within an low power or standby mode and passing no current through the appliance module.

The method may comprise dividing the power supply cycle into at least two portions, a first portion of the power supply cycle for the powering of the control unit and a second portion of the power supply cycle for the powering of the appliance unit, wherein providing a bypass module may comprise passing a current through the bypass module during the first portion and blocking current through the bypass module during the second portion. In such embodiments the bypass module may then not use power which would be used by the appliance unit when the appliance unit is active or actively powered.

The method may comprise receiving the power mode command wirelessly from the control unit. In such embodiments the power mode information may be passed according to any suitable wireless protocol such as radio frequency or infra-red wireless protocols.

The at least one controllable auxiliary module may comprise a wireless transceiver configured to receive a power mode command from the control unit. Thus in some embodiments a power mode command may be used to independently activate or deactivate the transceiver, for example to conserve power when the appliance unit is placed in a very low power standby mode.

The method may comprise receiving a power mode command as a power supply setting and adapting the bypass module accordingly. Thus in some embodiments the command may be passed over the power supply connection or coupling. For example when the transceiver is switched off and therefore it is not possible to pass a power mode over the wireless coupling. The method may comprise identifying the power mode command by determining a power supply voltage level greater than a threshold voltage value. Thus for example the appliance unit may comprise a wireless transceiver may be 'woken' up to enable further commands to be received based on whether the control unit supplies the appliance unit with a voltage greater than a defined or determined threshold voltage.

According to a fourth aspect there is provided a method for controlling a control unit for electrical connection in series with a power supply and at least one appliance unit, the method comprising: negotiating using a control module a power mode with the at least one appliance unit; selectively supplying electrical power, based on the power mode, to the control module, to at least one controllable auxiliary module, and to the at least one appliance unit, such that the at least one appliance unit is powered separately from the control module and the at least one controllable auxiliary module.

Thus the control unit may permit efficient power usage within an appliance unit comprising many different functional modules.

The method may further comprise: generating a power mode command; and selectively supplying power to control the at least one controllable light generating module of the appliance unit and the at least one controllable auxiliary module for performing functionality other than enabling the controlling of the appliance unit, based on the power mode command. Thus in some embodiments the control unit may be configured to further control the control unit such that the power consumption of the control unit comprising many different modules may be effectively controlled.

The method may further comprise passing current through the control unit to permit current to pass through the appliance unit, such that the appliance unit is configured to be sufficiently powered. In such embodiments a supply regulator module may supply both sufficient current and also voltage from the power supply even when the control module is inactive or not being powered.

The method may further comprise dividing the power supply cycle into at least two portions, a first portion of the power supply cycle for the powering of the control unit and a second portion of the power supply cycle for the powering of the appliance unit, wherein the first and second portion of the supply cycle is based on the power mode of the control unit and the power mode of the appliance unit respectively. This may for example be achieved by phase dividing the power supply cycle. For example the first portion may be an interval from the zero crossing to a defined phase angle and the second portion may be an interval from the defined phase angle to the next zero crossing.

The method may further comprise determining a current limit for a supply of power for the control unit being exceeded during the first portion of the power supply cycle by one of: determining a voltage drop over the appliance unit during the first portion of the power supply cycle; determining information on the maximum current limit of an appliance unit for the first portion of the power supply cycle. In such embodiments the control unit may determine whether there is sufficient current and therefore power available during the first portion of the power supply cycle to power the modules in the control unit.

The method may further comprise generating a power mode command for the control unit such that the current limit for the control unit is not exceeded. In such embodiments the power mode command may switch off/deactivate the power to some of the lower priority modules in order that higher priority modules may remain active and supplied with sufficient power to remain functional.

The method may further comprise logging as an event the determination of the current limit being exceeded. In these embodiments the log may be examined to determine whether any further system upgrades, such as increased current appliance units are required in order to allow the control unit to operate as desired.

The method may further comprise reporting as an event the determination of the current limit being exceeded. In these embodiments the report may be used to suggest whether any further system upgrades, such as increased current appliance units are required in order to allow the control unit to operate as desired.

The method may further comprise: generating and wirelessly transmitting a first power mode command to activate appliance units within wireless range; identifying a first set of appliance units which respond to the first power mode command; generating and transmitting a second power mode command to deactivate appliance units electrically connected to the control unit; identifying a second set of appliance units which remain in response with respect to the first power mode command; and generating a list of the difference between the first and second set of appliance units so to identify the appliance units which are wirelessly controllable and which are electrically connected to the control unit. In such embodiments the control unit may generate commissioning information which enables the control unit to control the appliance units which only are within the circuit and which are controllable. This for example identifies appliance units which may receive commands switching off appliance units which cannot then be re-activated using the power supply command examples shown herein.

The method may comprise transmitting the power mode command wirelessly to the appliance unit. Thus in some embodiments the power mode may be transmitted using any suitable wireless method.

The method may comprise generating the power mode command as a power supply setting to be passed to the appliance unit. Thus in some embodiments the power mode may be passed to the appliance unit in situations where the wireless link has been deactivated or is not supplied with power.

Introduction of smart power modes in a radio frequency (RF) controlled lighting assembly with integrated functionalities may thus ensure an efficient and independent operation of various operation states and functionalities.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
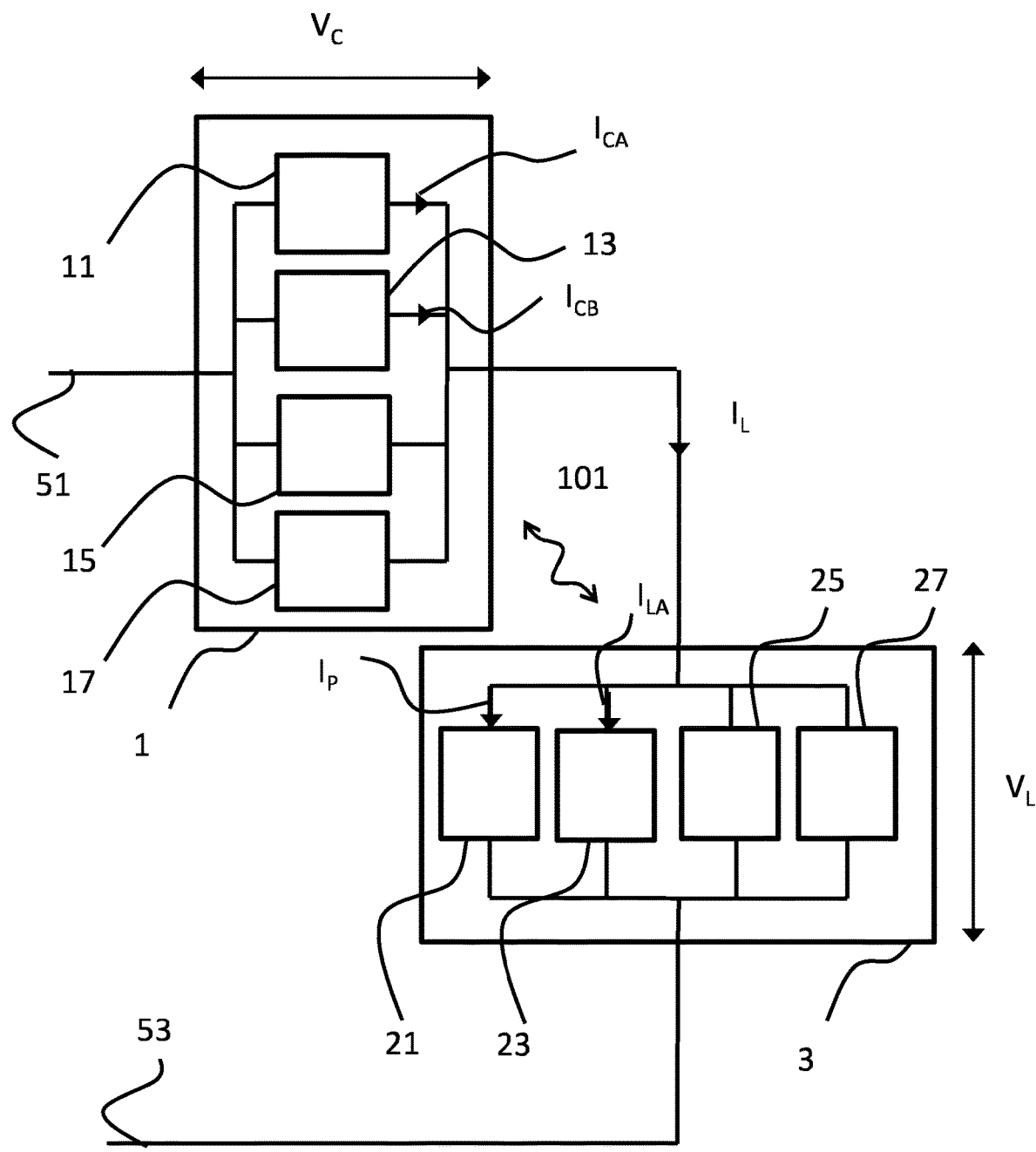
FIG. 1 shows an example lighting system comprising a series coupled control unit and light unit according to some embodiments.

It should be understood that the Figures are merely schematic and are not drawn to scale. It should also be understood that the same reference numerals are used throughout the Figures to indicate the same or similar parts.

The examples described herein describe controlling of power modes within a lighting system or assembly comprising a control unit configured to control at least one light unit, and the at least light unit for producing light, wherein the light unit is further configured to perform at least one other integrated function. Furthermore although the examples relate to an indoor lighting application, the invention can be applied more generally to lighting systems such as outdoor or street lighting applications. Although the examples relate to the preferred application of the invention to multi-function lighting systems, the invention can be applied more generally to the control of appliances having different power modes. Such devices are referred to in this description and claims as "appliance units". Although the examples below refer to the specific example of a light unit, the power control concepts can be applied more generally to other appliance units which do not have any light generating function.

The light unit and the unit providing the at least one other integrated function may together be considered to be a "light module". More generally, the combination of the "appliance unit" and any additional elements providing other functions may be considered to be an "appliance module".

The method of controlling power modes may comprise defining an array of power modes, the defining of power modes themselves comprise defining a first plurality of power modes for the at least one light unit, wherein the first plurality of power modes comprise at least one power mode for controlling the activation of a power supply within a light unit to perform the at least one integrated function independent of the operation of the light unit to produce light. The method may furthermore comprise selecting one of the first plurality of power modes for the light unit and communicating the selected power mode from the plurality of power modes for the light unit from the control unit to the at least one light unit, such that the at least one light unit power usage is controlled. In such a manner it may be possible to enable the control of power for the light unit such that the integrated functionality is activated independently of the lighting functionality of the light unit.

With respect to FIG. 1 an example control unit 1 and light unit 3 is shown. In the example shown in FIG. 1 the light unit 3 (also known as a controllable light unit) may be suitable for electrical connection in a series arrangement with the control unit 3 and a power supply. In other words there is an electrical pathway which is defined as passing from one terminal 51 of the power supply, through the control unit 1 and through the light unit 3 ending at the other terminal 53 of the power supply. The power supply may be a mains power supply but may be any suitable power supply such as provided by an off-mains power generator. Furthermore as shown in FIG. 1 the light unit 3 and the control unit 1 may be further coupled by a radio frequency communications connection, shown by the arrow 101, which is suitable for communicating power mode commands.

The control unit 1 may be an integral control unit comprising modules such as a control module 17. The control unit may be an enclosure or other mechanical structure, such as a wall box, within which the modules as discussed hereafter can be located. The example control unit 1 may comprise a control module 17 for negotiating power modes with the light unit 3. For example the control module 17 may be configured to control the least one light unit 3 with respect to generating a specific lighting effect. The control module may for example be configured to generate instructions or commands to be passed to the lighting unit 3. These commands may comprise power mode commands as described in further detail herein.

The control unit 1 may furthermore comprise at least one controllable auxiliary module 15 for performing functionality other than negotiating power modes with the light unit 3. For example the at least one controllable auxiliary module 15 comprises a touch screen display configured to operate as a suitable user interface for the control unit 1. The at least one controllable auxiliary module 15 may further comprise a variable or controllable backlight to assist the user in reading or seeing the information on the touch screen display. The touch screen display may be replaced or enhanced by any suitable user interface element. For example the user interface may be implemented by conventional switches or dials. These switches or dials may be lit or backlit by lights within the control unit.

The at least one controllable auxiliary module 15 may further comprise a (wireless) transceiver. The wireless transceiver may be configured to receive the commands generated by the control unit 1 and transmit the commands to the light unit 3. The transceiver may comprise a suitable radio-frequency or infrared transceiver implementing any suitable data protocol. For example the transceiver may be a Zigbee, Bluetooth, IrDA, or Wi-Fi (IEEE 802.11) transceiver. An example of a controllable auxiliary module is a signal communication bridge, such as is used in the lighting system of Philips (trade mark) called the "hue system". The heart of the hue system is a bridge between a user's software application and the bulbs of the system. The bridge is linked to Wi-Fi via the user's router. It can for example connect up to 50 bulbs at a time. The bridge enables external connection to the system so that lights can be controlled remotely.

The system enables the lighting unit and this communication bridge to be connected as a two-wire unit. The bridge may for example feature a Wi-Fi radio for wirelessly connecting to a WLAN router (as explained above) and also a Zigbee radio for connecting with home automation devices such as lamps or wall switches or heating devices. A further example is where the Wi-Fi radio can be used as a simple access point without requiring a connection to a WLAN router or 'the cloud'.

There are domestic applications for the bridge in homes, and also professional applications like conference rooms or offices. As no neutral wire is required by the two-wire system, existing homes, conference rooms or offices can be easily retrofitted to provide advanced control of facilities such as lighting and heat.

The at least one controllable auxiliary module may comprise a power socket. The power socket may enable the control unit 1 to provide the functionality to enable a mobile phone or other device to be charged or powered.

The at least one controllable auxiliary module 15 may furthermore comprise a sensor for monitoring the environmental conditions. The sensor may be any suitable sensor such as an integrated occupancy sensor, an integrated room temperature sensor, a carbon dioxide ($CO_2$) sensor, or a moisture sensor. The auxiliary module may be a wall box radio for listening to music, or the at least one controllable auxiliary module 15 may be part of a larger system such as an alarm security system, emergency system or heating ventilation and air conditioning (HVAC) system.

The control unit 1 may further comprise a supply regulator module for selectively supplying electrical power to the control module 17, the at least one controllable auxiliary module 15, and the at least one controllable light unit 3. The selective supply of electrical power is such that the at least one controllable light unit 3 is powered separately from the control module 17 and the at least one controllable auxiliary module 15. The supply regulator comprises a supply module 11 connected in parallel with the controllable auxiliary module 15 and control module 17. The supply module 11 may be controllable by the control module 17 and configured to selectively supply electrical power to the control module 17 and the at least one controllable auxiliary module 15. This supply of electrical power may for example be considered to be a passing of current through the supply module 11. This passing of current may, because of the series connection of the light unit and the control unit, enable the supply of power to a suitable control unit in the light unit.

The supply regulator module may further comprise an operating module 13 controllable by the control module 17 and configured to selectively supply electrical power, to the at least one controllable light unit 3.

The supply regulator module (which may comprise the supply module 11 configured to supply power for use within the control unit and the operating module 13 configured to supply power to the light unit) may then be configured to divide the total input power or mains cycle (as defined by the mains input frequency) into intervals or portions for the powering one or other of the control unit or the light unit. The control unit 1 and in particular the control module 17 may thus be configured to define a first interval for powering a first part (the control unit) of the lighting installation while the other series connected part (the light unit) allows a suitable current path to pass. The control unit 1 (and in particular the control module 17) may further be configured to define a second interval for powering the second part (the light unit) of the system while the other, series connected part (the control unit) allows a suitable current path. The division of the power cycle can be defined via timing of the total power circuit cycle. For example the division of the cycle may be based on a measurement from the zero crossing, from a zero crossing with a certain polarity, or from a peak value. The division of the power cycle may be determined by a measurement of voltage. The control module 17 by employing an energy storage element in some implementations is continuously powered even in the interval of the power cycle where the control unit is not powered.

In order to produce an efficient system, it is arranged that during the part of interval when one of the light unit or control unit is being powered, the other is configured to pass a current with minimal or limited power loss. For example the supply regulator module and in particular the operating module 13 configured to provide power to the light unit should be configured to have a small or minimal power consumption when actively supplying current to the light unit 3. The operating module 13 may be implemented as any suitable controlled power switch.

The control module 17 may be configured to control the at least one controllable auxiliary module 15 and the supply regulator module based on the power mode. In other words the control module 17 may control the supply power regulator to control and regulate power to the modules of the control unit 1 and control and regulate power to the light unit 3.

The light unit 3 may be an integral light unit comprising modules such as described herein. The light unit may be within a light unit enclosure or other mechanical structure, for example a junction box, within which the modules as discussed hereafter can be located.

The light unit 3 comprises at least one controllable light generating module 23. The at least one controllable light generating module 23 may be controllable LED units. Although LED units are shown herein it will be understood that the light generating module 23 may employ any suitable light generating elements.

A light unit 3 (or more generally an "appliance unit") comprises the light generating module and at least one controllable auxiliary module 25 which provides functionality other than generating light. Thus for example the at least one controllable auxiliary module 25 may comprise a wireless (radio-frequency or infrared) transceiver configured to receive commands from the control unit 1. In a manner similar to the control unit 1, the light unit 3 may further comprise at least one controllable auxiliary module to enhance the operation of the light unit. For example the at least one controllable auxiliary module 25 may comprise acoustic functional modules (such as acoustic transducers) to provide audio output, sensors to gather information from the surroundings, cameras and fans and a power socket. As described with regard to the control unit, the sensor may be any suitable sensor. For example the sensor may be a sensor integrated within an emergency or alarm security system, a presence sensor, a radio-frequency sensor, a light sensor, a near field communication (NFC) sensor or a colour sensor. The power socket similarly can be any suitable power socket for powering any external apparatus. For example the power socket may enable the operation of infrared light units in a security camera system. An example of a further controllable auxiliary module 25 is a bridge such as described previously with respect to the control unit 1.

The light unit 3 may further comprise a control module 27 for negotiating with the control unit 1 a power mode. The control module 27 may for example be configured to receive and interpret power mode commands from the control unit and be further configured to control the light generating module or the at least one auxiliary module unit based on the power mode. Furthermore the control module 27 may receive other commands such as light control commands, for example to selectively switch on or off LEDs within the light generating module 23 or control the intensity of the light generated by the LEDs within the light generating module 23. The control module 27 by employing an energy storage element in some implementations is continuously powered even in the interval of the power cycle where the light unit is not powered.

The light unit 3 may furthermore comprise a bypass module 21. The bypass module 21 may be configured to pass current through the light unit 3 but not through the controllable light generating module, such that the bypass module 21 is configured to pass a current to enable the control unit 1 to be powered separately from any current passed by the at least one controllable light generating module 23 and at least one controllable auxiliary module 25. The bypass module 21 is controllable by the control module 27 based on the power mode.

The bypass module 21 may comprise a suitable current path circuit. The bypass module 21 may be arranged in a parallel configuration with the light generating module 23, the control module 27 and the at least one auxiliary module 25 all of which are connected between the light unit power supply input and output terminals. The bypass module 21 may thus be any suitable circuitry configured to define a sufficiently low or predetermined impedance to allow current flow to occur through the light unit and thus enable the control unit to operate. The bypass module 21 may be a circuit configured to define a sufficiently low impedance only when the voltage across the circuit is less than a defined or threshold voltage. This for example may be useful where when the light unit 3 is active or switched on that as little current as possible is lost through the bypass module 21.

Embodiments of the invention described herein feature the negotiation and implementation of power modes for light units with at least one controllable light generating module and at least one auxiliary module in order to ensure efficient and independent operation. This provides implementation of power modes or power control modes for controlling power utilisation in a light unit. This may be performed by receiving power mode commands such that the auxiliary modules can be activated independently of each other and the light generating module (the LED unit). The light unit may thus be operated in a more flexible and more power efficient manner. Similarly embodiments described herein feature the ability to negotiate and implement power modes for the control unit such that the various modules of the control unit may be activated independently of each other. Furthermore where the control unit and light unit are connected in a series arrangement the activation of modules within the control unit may be separately controlled from the activation of modules in the light unit.

The power modes and power mode commands for the light unit and the control unit define which of the modules are to be switched on and supplied with power and which of the modules are to be switched off and not supplied with power. The power modes may define the level of activity of the module, for example whether the module is fully on, fully off or partially on/partially off. For example a power mode may define or determine that the transceiver is to be switched on, switched off, operated only in receive mode, or switched on only for a specific time period. Furthermore the power modes may define or determine the power required for a defined level of activity of the module. For example there may be a first power mode which enables a transceiver to operate at a low power transmission mode and a second power mode which enables a transceiver to operate at a high power transmission mode. The power modes may define classes or types of modules which are to be switched on (be active) and which are to be switched off. Furthermore the power mode may define a priority order of powering or activating modules. The power modes may be implemented such that a new power mode command replaces a previous power mode command or may be implemented such that the power modes can be asserted and de-asserted separately or in combination. For example a first power mode command may activate or power up a first module, a second power mode command may activate or power up a second module. In embodiments where the power mode commands replace each other a third power mode command configured to switch on both modules may be required in order to be able to select all of the possible combinations of modules. The command or instruction communicated by the control unit and/or light unit may be any suitable format.

The table below shows for example light unit power modes, a 'designation' code associated with the power mode and the functionality of the light unit enabled by such power modes.

| Designator (Light unit power mode . . . ) | Power mode | Functionality of Light unit |
|---|---|---|
| L_PM0 | Off mode | No activity |
| L_PM1 | Soft-off mode | No activity, forced by an internal command and left without an internal command |
| L_PM2 | Low power stand-by mode | RF modem on (normal "short range" Zigbee) |
| L_PM3 | Medium power stand-by mode | Enable the light unit to also act as Zigbee booster if required (e.g. if range is off normal Zigbee is not sufficient) |
| L_PM4 | Stand-by mode(s) | Active: sensor (s), fan, acoustic function, camera, . . . |
| L_PM5 | Stand-by mode for supporting 2-wire wall-box modules | The light unit provides certain impedance to allow 2-wire wiring-accessories, which are connected in series to the light unit, to draw sufficient off-state and on-state |

| Designator (Light unit power mode . . . ) | Power mode | Functionality of Light unit |
|---|---|---|
| | | leakage current required for operation of the wiring accessory |
| L_PM6 | Stand-by mode for supporting 2-wire control-panel which acts as Zigbee booster | Required if the wiring accessory or control unit acts as Zigbee booster (i.e. radio uses higher power to enable long range RF; right now in HUE only the Zigbee bridge is a booster) |
| L_PM7 | Active mode | light unit on (inclusive the power supply needed for the controller) |

As can be seen in the table above the first power mode L_PM0 is one where the light unit is configured to switch off activity in the light generating module and also all auxiliary modules. The last power mode L_PM7 represents the mode where all modules including the light generating module are fully switched on. The other power modes L_PM1 to L_PM6 represent various combinations of auxiliary modules being switched on or off. Thus for example power modes L_PM2 and L_PM3 define power modes where only the RF modem (the wireless transceiver) are switched on and other auxiliary modules and the light generating module are not supplied with power/switched off. L_PM4 defines a power mode (or modes) whereby further auxiliary modules are switched on but the light generating module is switched off. L_PM5 and L_PM6 define power modes whereby the auxiliary modules are switched on to provide a suitable current path or as described herein to activate a bypass module so that the control unit is able to draw a sufficient current to operate despite the light unit being 'off'.

Furthermore the table below shows for example control unit power modes, a 'designation' code associated with the power mode and the functionality of the control unit enabled by such power modes.

| Designator Control unit power mode . . . ) | Power mode | Functionality control unit |
|---|---|---|
| CP_PM0 | Off mode | No activity |
| CP_PM1 | Low power stand-by mode | Backlight display on |
| CP_PM2 | Stand-by modes | Active: display, sensor, security function, . . . |
| CP_PM3 | Stand-by mode for supporting LED lamps which acts as Zigbee booster | |
| CP_PM4 | Active mode | Lighting active |

As can be seen in the table above the first power mode CP_PM0 defines where all control unit module activity is switched off. The last power mode CP_PM4 represents the mode of operation where the control unit is actively controlling the light generating module within the light unit. The other power modes CP_PM1 to CP_PM3 represent various standby modes of operation wherein auxiliary modules are selectively activated. Thus for example CP_PM1 defines a power mode where only the display backlight is on. CP_PM2 defines a power mode (or modes) where various auxiliary modules such as the display, a sensor, or security function module may be activated. Furthermore CP_PM3 defines a power mode whereby only the RF modem (the wireless transceiver) are activated and operate as a repeater for control of light units based on commands from other control units.

The power mode of the light unit may be set or modified by the light unit. For example the light unit may detect an input, such as a plug being inserted into the power socket which causes the controller/processor to activate the socket by generating a suitable power mode command. This power mode command may, as well as being implemented on the light unit for example activating the power socket, also be transmitted to the control unit such that the control unit may provide suitable power to the light unit, for example to enable the power socket to be active.

A practical aspect of implementing these power modes is that the control unit 1 should not only control the different power modes but in the case of a series or two-wire configuration it should also ensure that there is sufficient power (current) available to have the light unit light generating module active. In a series or two-wire arrangement this power (current) may be limited by the control unit (whereas in a parallel or separate arrangement this is not the situation).

As described herein and shown in FIG. 1 the light unit and the control unit may be retro-fitted or implemented within a conventional two-wire or series arrangement. In this arrangement the control unit (and the power regulator of the control unit) may be configured to provide a minimal phase cut from the input power to generate a differential voltage across the control unit terminals to power the control unit. In other words the control unit 1 is configured to operate such that a portion or first interval of the power cycle of the input power may be used by the control unit 1. For example depending on the standby power mode that is required by the control unit 1, the phase cut or interval of the power cycle may be several tens of the degrees of phase (for example 45 degrees).

In order that sufficient power or current is available for the control unit 1, the light unit 3 within such an arrangement furthermore has to be configured to provide a sufficiently low or predetermined impedance to allow current flow through the control unit. If the impedance is not low enough the differential voltage across the control unit terminals will decrease and the control unit may not be able to supply sufficient power for the control unit to function as expected.

Figure 2:
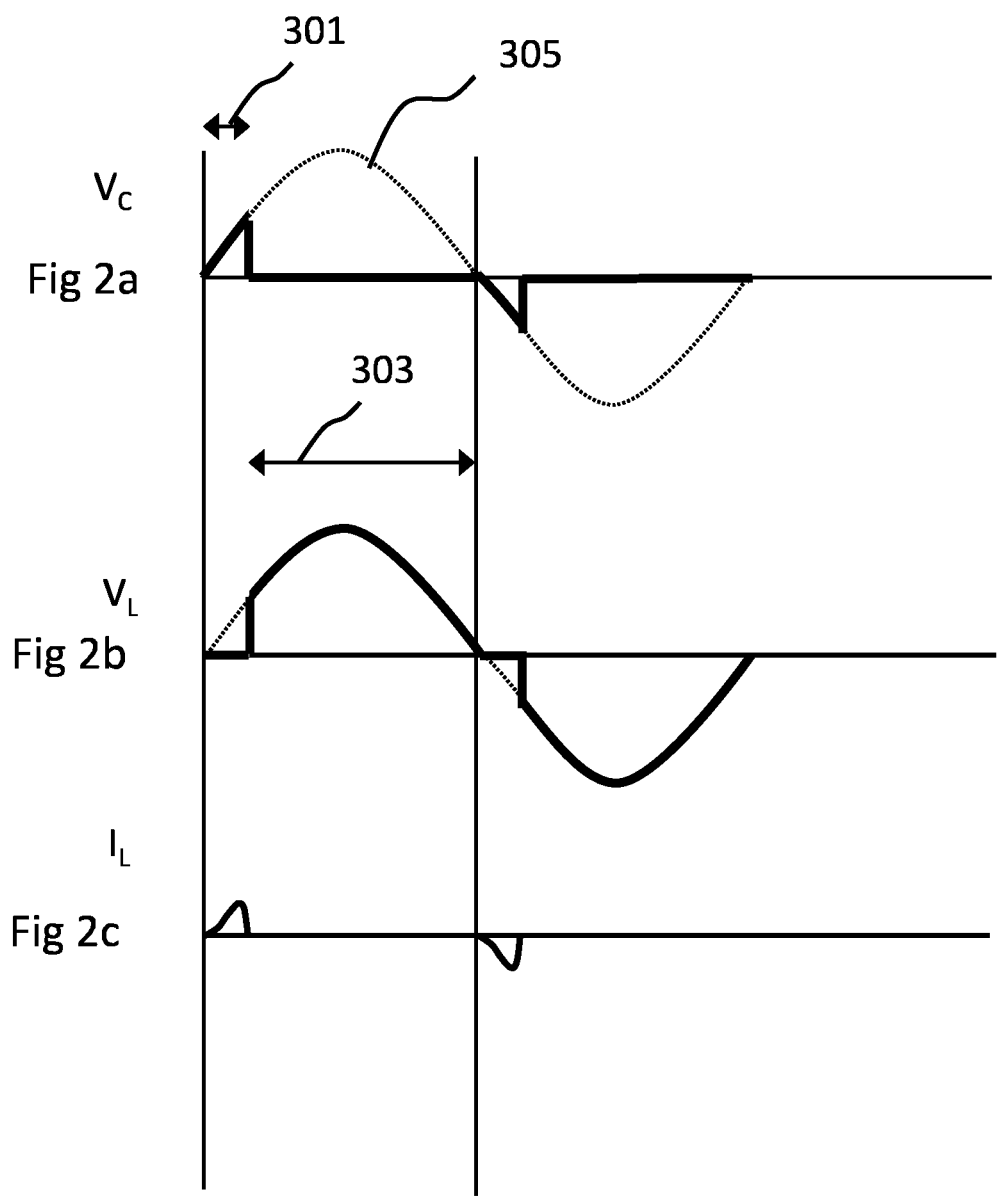
FIGS. 2a to 2c show voltage and current graphs for a lighting system as shown in FIG. 1 according to some embodiments.

With respect to FIGS. 2a to 2c example voltage and current waveform graphs are presented with respect to the series arrangement shown in FIG. 1. The control unit voltage ($V_C$) is shown in FIG. 2a, the light unit voltage ($V_L$) is shown in FIG. 2b and the light unit current ($I_L$) is shown in FIG. 2c. In this example the light unit 3 is operating in a low or standby power mode where the at least one light generating module 23 is switched off. In other words the light unit 3 is not configured to generate light and therefore no current passes through the at least one light generating module 23. Furthermore for this example the at least one auxiliary module 25 and the control module 27 may be considered to be inactive or passing a negligible current.

However the control unit 1 in this example is considered to be operating in a power mode suitable to enable the control unit 1 to control the light unit 3 to switch on the light generating module 23 if requested. The control unit 1 power mode (or any power mode requiring at least part of the control unit to be powered up) therefore requires a current to be passed through the light unit 3 for at least the portion of the power cycle used by the control unit 1.

As shown in FIGS. 2a to 2c the power cycle can thus be divided into at least two portions or intervals of the power cycle. Although the following examples show a leading edge cut, wherein the power cycle is divided at a phase point following the zero crossing, the cut can be any suitable phase cut. For example the phase cut can be a trailing edge cut (a phase point before the zero crossing). Similarly the portions or intervals can be defined within the power cycle by a start phase point and an end phase point other than the zero crossing.

The at least two portions of the power cycle may be a first interval or portion 301 where the control unit 1 uses the input power and a second interval or portion 303 where the control unit 1 may forward or pass the input power to the light unit 3. This is shown by the voltage being dropped across the control unit 1 in the first interval 301, as shown in FIG. 2a where the voltage $V_C$ follows the input voltage 305 during the first interval. Then for the second interval 303 the voltage is dropped across the light unit, as shown in FIG. 2b where the voltage $V_L$ follows the input voltage in the second interval. Furthermore the current path circuit 100 is shown passing a current $I_L$ during the first interval 301 but not the second interval 303.

Figure 3:
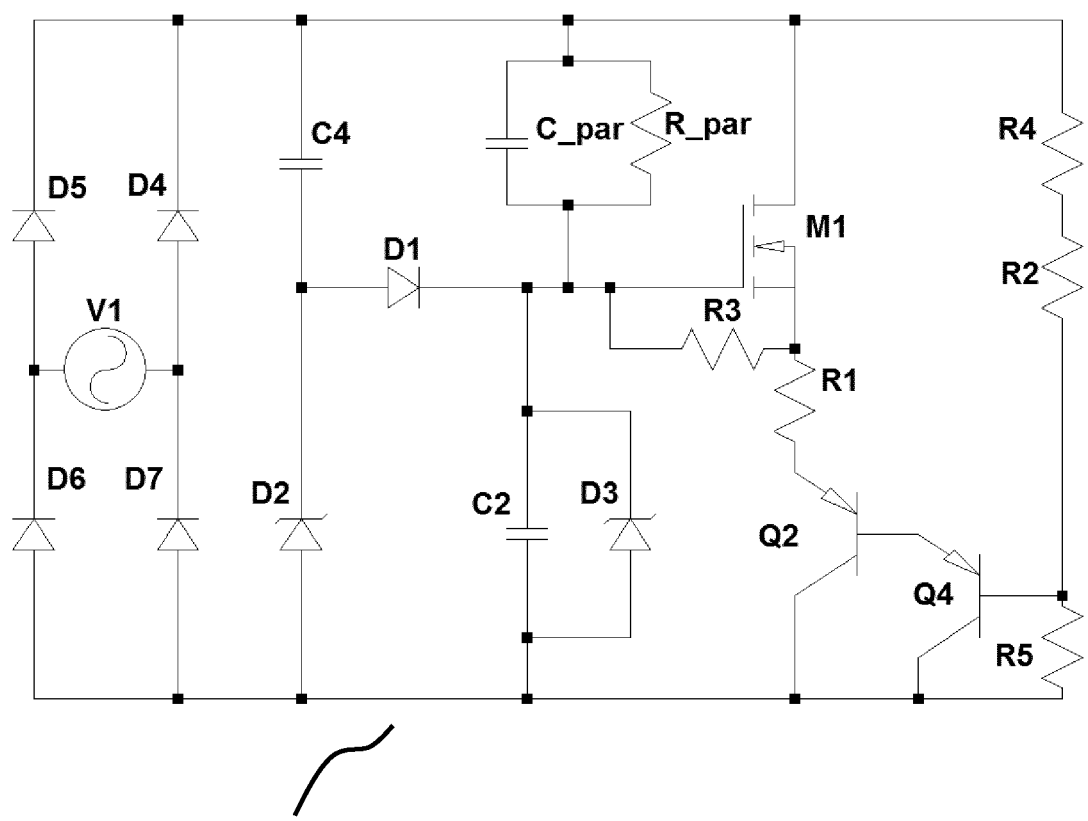
FIG. 3 shows an example by-pass module circuit as featured within the light unit as shown in FIG. 1.

With respect to FIG. 3 an example current path circuit 100 is shown. The example bypass module 21 circuit shown in FIG. 3 is a type of circuit known as a cat's ear bleeder circuit. The cat's ear bleeder circuit receives an input, shown by the voltage supply V1 and is configured to pass a low current when the input potential to the circuit is low and to limit the current when the voltage is higher than a threshold voltage (such as 70 V). Thus for example at low voltages the PNP transistors Q2 and Q4 are switched on and the current controlled by the field effect transistor M1 based on the biasing components in order to produce a sufficiently low impedance to allow current flow through the control unit when the input voltage is low. Furthermore when the input voltage is high, the base voltage of Q4 is raised via the voltage divider R4, R2, R5. As a consequence, source-potential of the Mosfet M1 is raised, too. In combination with the limited gate voltage of M1, the total voltage across the gate-source-path of the Mosfet as well as the resistor R1 is reduced, hence the current in the drain of the Mosfet is reduced and may reduce to nearly zero, depending on the dimensioning of the component. The bypass module 21 may then be configured to produce an impedance which is stable and consistent for each and every power or mains cycle. This can be compared to a switched mode power supply running in burst mode where the impedance is not stable or consistent for every mains cycle.

The bypass module 21 may be implemented as part of the power regulation circuitry of the light unit. Furthermore the bypass module 21 may be controllable and as such may be 'switched on' or 'switched off' based on a determined power mode.

Figure 4:
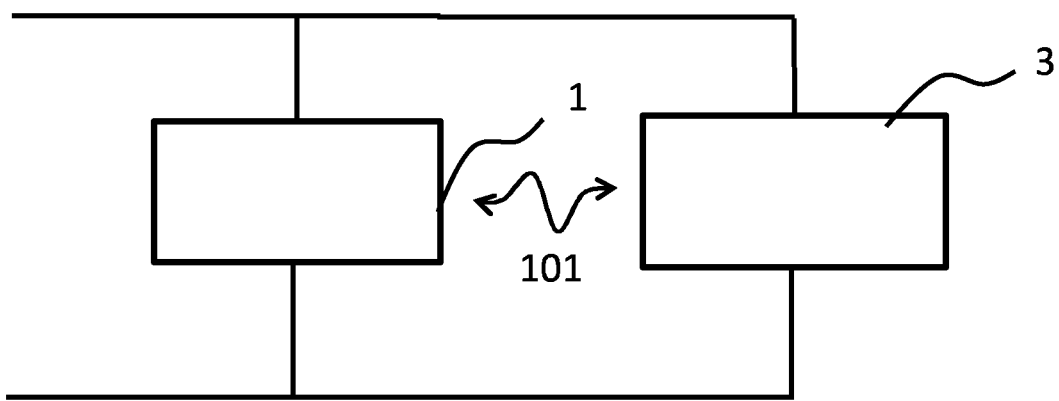
FIG. 4 shows an example lighting system comprising a parallel coupled control unit and light unit according to some embodiments.

The light unit 3 and the control unit 1 such as shown in FIG. 1 may be implemented in a parallel arrangement such as shown in FIG. 4 instead of the series arrangement of FIG. 1. The control unit 1 may be configured to communicate with the light unit 3, over the radio frequency communications connection shown in FIG. 4 by the arrow 101 in order to provide power mode commands for controlling the activation of modules. In this arrangement the control unit 1 and light unit 3 may implement power modes for controlling the light unit and control unit in a suitable manner. In a parallel arrangement such as shown in FIG. 4 there is no requirement to keep either the light unit or the control unit active or to maintain a suitable current path when either is inactive. This is because the control unit has available both live and neutral connections and thus can be operated completely independently from the light unit (or the light unit load). Furthermore in such arrangements the light unit may have a standby power supply in the form of a burst mode switched mode power supply without any restrictions on input impedance and consistency over multiple mains cycles.

Figure 5:
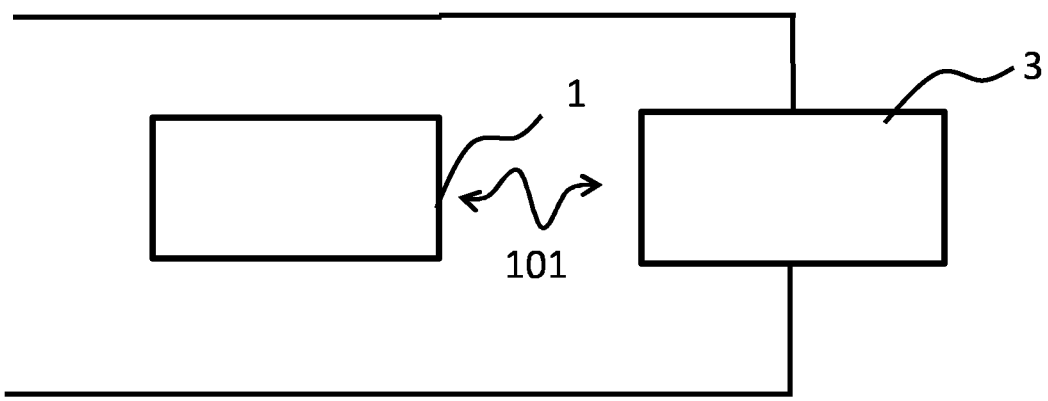
FIG. 5 shows an example lighting system comprising an independent or isolated control unit and light unit according to some embodiments.

With respect to FIG. 5 an example isolated arrangement is shown wherein the control unit 1 is isolated from the light unit 3. The control unit 1 may be configured to communicate with the light unit 3 over the radio frequency communications connection shown in FIG. 5 by the arrow 101 in order to provide power mode commands for controlling the activation of functional modules. The light unit 3 may be directly connected to the power supply. In this case, the light unit 3 is required to be operated within a power mode which maintains the communication path modem (the transceiver) to be on for a portion of the power cycle in order to receive suitable power mode commands. For example the light unit 3 may be maintained in a standby mode wherein only the transceiver is active and 'listening'. The light unit 3 may be maintained in a low power standby mode where the transceiver is active and 'listening' for only part of the power cycle or for a defined portion of a time period.

In the examples shown the communication of power modes in the form of power mode commands or instructions is performed between the control unit 1 and the light unit 3 over a wireless link such as a radio frequency communications connection shown by the arrow 101. A passive system can instead be implemented wherein 'commands' are communicated passively by the 'voltage' supplied to the light unit 3 from the control unit 1. Although the examples show the supply voltage levels as being the power mode designators or commands, other power line communication approaches may be used to communicate the power mode settings. The power mode settings can be voltage level values and/or current values. The appliance unit again can receive the command and adapt the bypass module accordingly.

Figure 6:
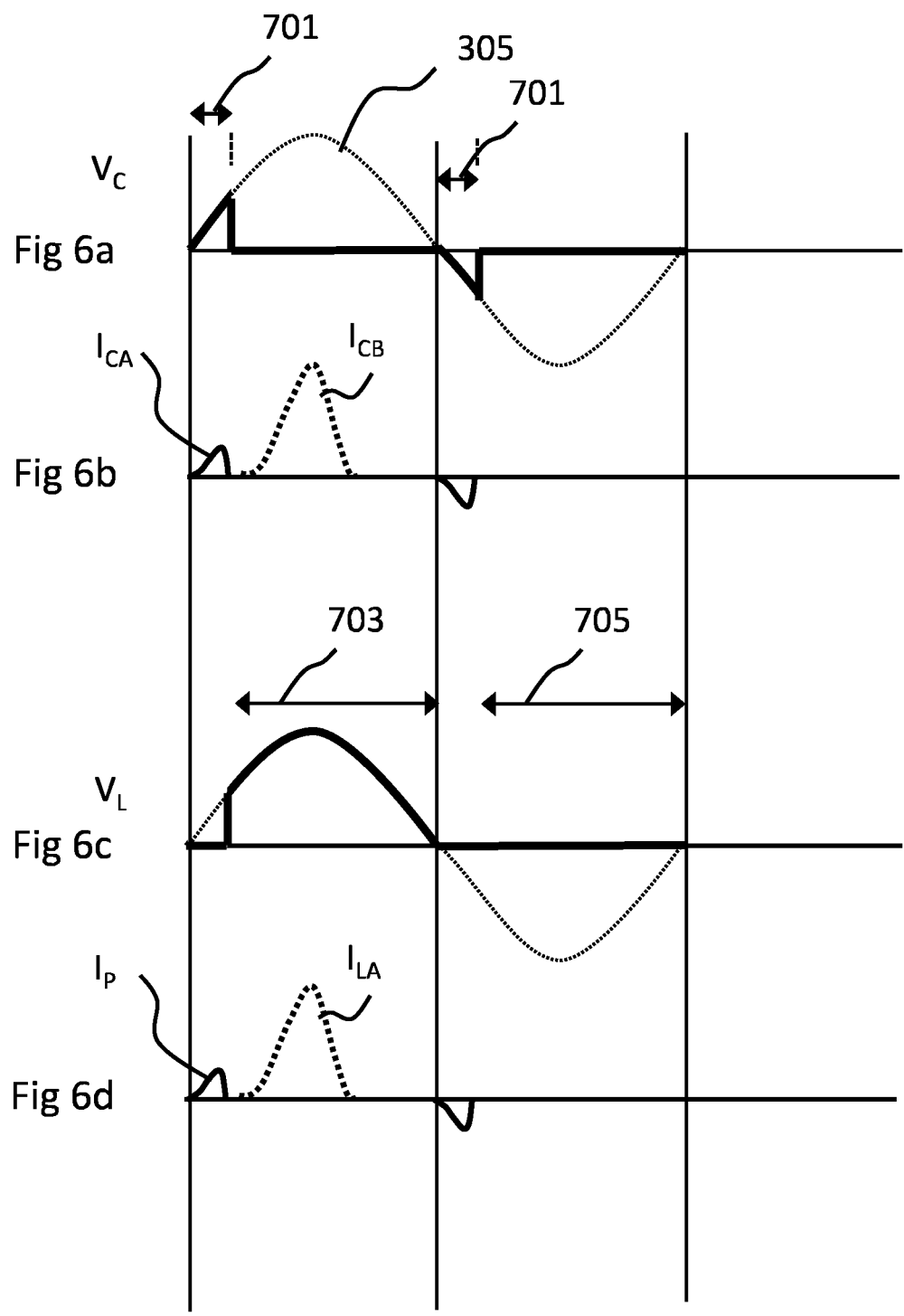
FIGS. 6a to 6d show further voltage and current graphs for a lighting system as shown in FIG. 1 according to some embodiments.

An example of the voltage and current waveforms for the control unit 1 and light unit 3 are shown in FIGS. 6a to 6d for the arrangement shown in FIG. 1. FIG. 6a shows the voltage across the control unit ($V_C$) and FIG. 6b shows the current through the supply module 11 ($I_{CA}$) and operating module 13 ($I_{CB}$) regulator parts of the control unit. FIG. 6c shows the voltage across the light unit ($V_L$) and FIG. 6d shows the current through the light generating module 23 ($I_L$) and the bypass module 21 ($I_P$) parts of the light unit.

The FIGS. 6a to 6d show for the first interval 701 that the power supply 305 is used to provide power for the control unit 1. FIGS. 6a and 6b for example shows the voltage across the control unit ($V_C$) following the mains voltage 305, and a current passing through the supply module 11 ($I_{CA}$). This current passing through the supply module 11 is the same current passing through the bypass module 21 ($I_P$) as shown in FIG. 6d. The control unit 1 power may be defined by $V_C \chi I_{CA}$. The bypass module 21 may be current limited and may be implemented as protection circuitry.

The FIGS. 6a to 6d further show a second interval 703, 705 where the power cycle may provide power for the light unit 3. The second interval is shown in FIGS. 6a to 6d where for one 703 of the second intervals the operating module 13 is configured to supply the power voltage to the light unit 3 and for the other 705 of the second intervals the operating module 13 supplies no voltage and no current to the light unit. This is shown for example with respect to FIG. 6c where for the first half of the power cycle the light unit voltage ($V_L$) follows the power supply voltage waveform and for the second half of the power cycle the light unit voltage remains at 0.

The operating module 13 as well as switching the voltage may provide a suitable current path through the control unit 1 to permit the light unit 3, when in operation, to be active. Thus for example during the second interval 703 FIG. 6d shows a current ($I_L$) which is mirrored by the current ($I_{CB}$) through the external power regulator shown in FIG. 6b.

The control unit 1 and the control module 17 may be configured to generate a power mode command by controlling the operating module 13 to output a power supply voltage level value. For example the control module may control the operating module to output a voltage level above a defined threshold value to provide a defined power mode command. Furthermore the light unit 3 and the control module 27 are configured to monitor or detect when a minimum voltage or threshold voltage level is provided to the light unit 3. When the light unit 3 detects the input voltage rising above the threshold value then the control module 27 is configured to selectively control a module within the light unit. For example at a defined voltage threshold the control module 27 may control the transceiver to start to be able to receive radio frequency commands. These radio frequency commands may then for example be further power mode commands to switch the light unit from a 'standby' mode to a lighting active mode.

The control modules 17, 27 may communicate an activate 'light generating module' power mode based on an output/received voltage value. For example the control module 17 may be configured to control the operating module 13 to limit the output voltage passed to the light unit based on the light unit power mode to be implemented and the control module 27 in the light unit 3 is further configured to determine when more than one voltage threshold has been passed. For example the control module 17 in the control unit may control the operating module 13 to limit the power supply voltage to be greater than a low threshold value but below a high threshold value. The light unit 3 control module 27 may then detect the input voltage reaching a low threshold voltage and control the activation of the light unit into a standby mode. Furthermore control module 17 in the control unit may control the operating module 13 to provide the full power supply voltage to the light unit 3 and the light unit 3 control module 27 detect when a voltage reaches a high threshold value and control the activation of the light unit into a full power mode and therefore bypass the standby mode.

Figure 7:
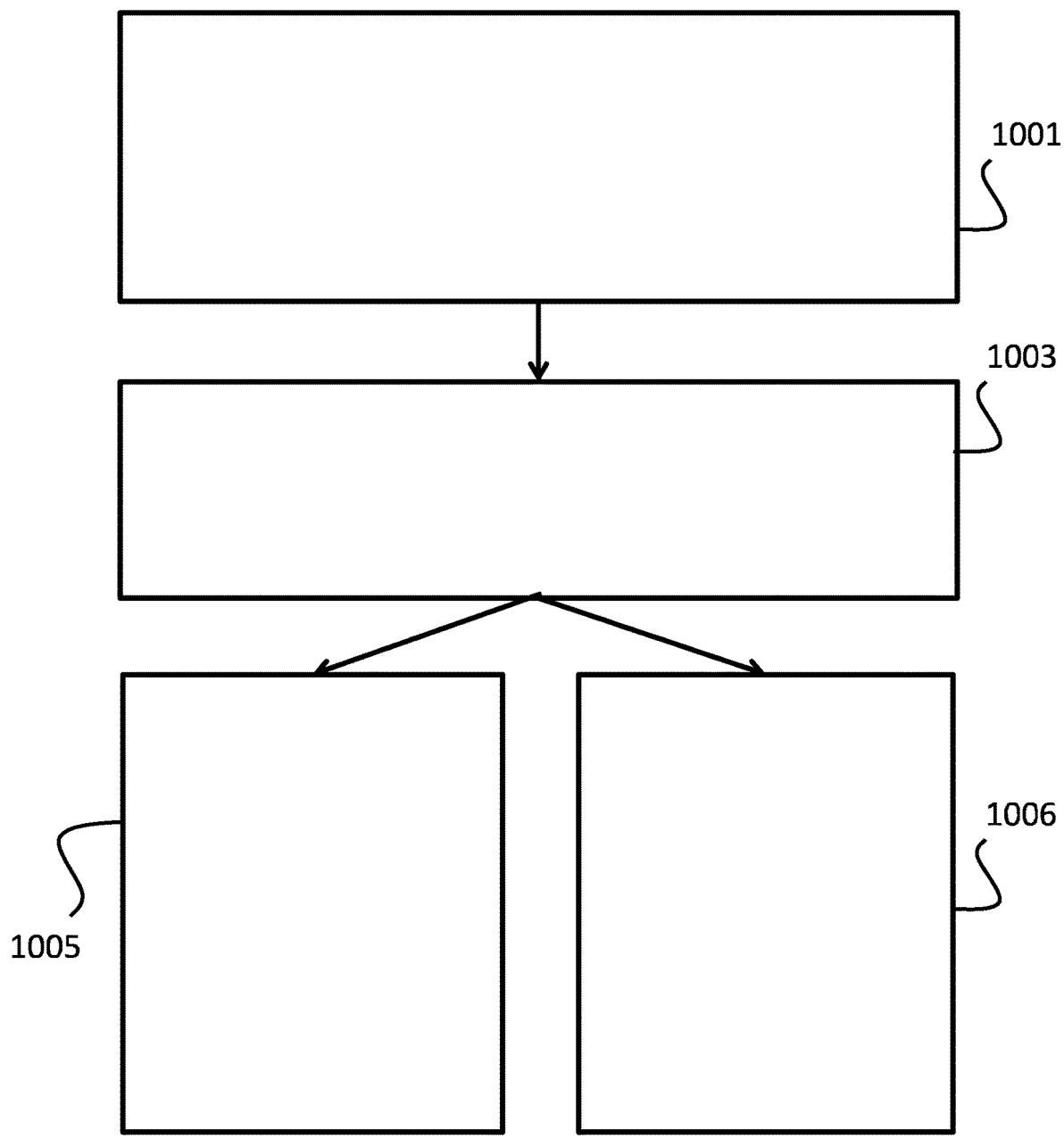
FIG. 7 shows a flow diagram showing an example operation of power mode control for the light unit within the lighting system as shown in FIG. 1 according to some embodiments.

With respect to FIG. 7 a flow chart showing an example operation of the system shown in FIGS. 1 and 6a to 6d is further detailed.

In this example the control unit 1 initially determines that the control unit is to be operated in a low power or stand-by mode (not implementing any functionality other that waiting for a user input) and that the light unit 3 is to be operated in an off mode (all functionality of the light unit being switched off). The control unit 1 may implement these power modes by splitting the power cycle into at least two intervals.

The operation of determining or splitting the power cycle into at least two intervals is shown in FIG. 7 by step 1001.

For the first interval the input power provided to the control unit 1 is configured to provide the power required to activate the modules to maintain a standby mode (while the light unit 3 and in particular the bypass module provides a suitable current path for the series arrangement to function).

Figure 8:
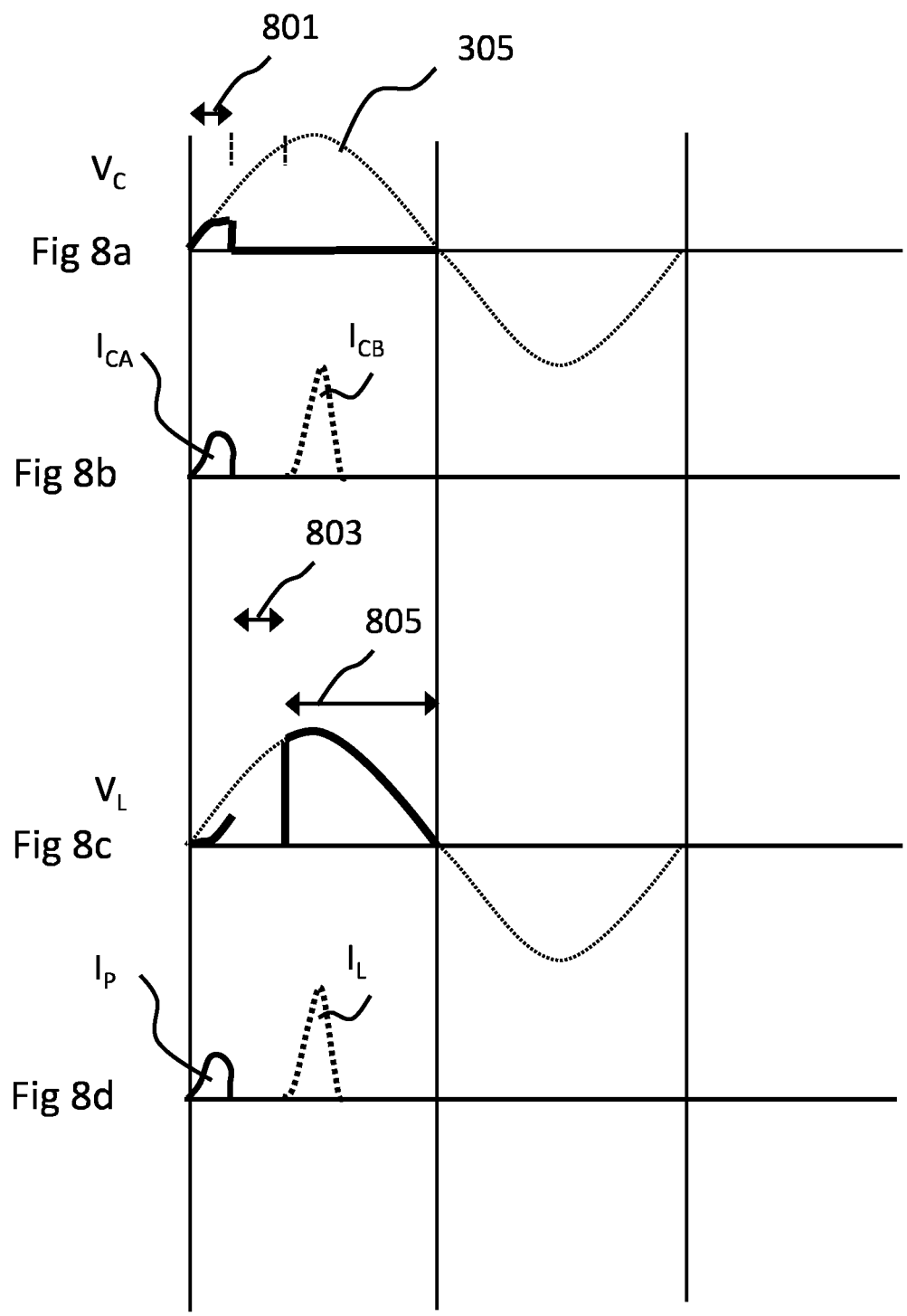
FIGS. 8a to 8d show further voltage and current graphs for a lighting system as shown in FIG. 1 according to some embodiments.

The operation of performing for the first interval supply of power to the control unit 1 and the light unit 3 providing a suitable current path when 'off' is shown in FIG. 8 by step 1003.

For the second interval the control unit 1 may 'pass' or transmit the determined power mode by either connecting the light unit 3 to the input power supply when the power mode is to be a standby mode or disconnecting the light unit 3 from the input power supply to maintain an off power mode.

Thus, when the control unit 1 connects the light unit 3 to the power supply to initiate a standby power mode the light unit 3 may determine the power voltage being above a threshold voltage and respond to this to power up modules associated with the standby power mode. For example this standby response may be to power up the transceiver to be ready to receive further power mode commands wirelessly.

The operations of determining a voltage above a threshold voltage and powering at least some modules in the second interval is shown in FIG. 7 by step 1005.

When the control unit 1 disconnects the light unit from the power supply for the second interval to maintain an off power mode the light unit 3 may determine the power voltage is below a threshold voltage and respond to this by remaining in the off mode.

The operations of determining a voltage below a threshold voltage and remaining in an off mode in the second interval is shown in FIG. 7 by step 1006.

The control of power may be based on more than the control unit power mode (or the state of the control unit). For example in a low-power usage power mode the current required to be passed by the light unit may be possible using suitable modules such as the bypass module 21 shown herein. However in a high-power usage power mode the current required may be in excess of the current possible to be passed by the bypass module 21 using reasonable components. Although the current may be supplied in situations where there is more than one light unit 3 in parallel (and therefore the maximum current available may be the current of the bypass module 21 scaled by a factor of the number of light units in parallel), the control unit 1 may still monitor when the current (and therefore power usage) is in excess of the available power.

An example of situation where the current required may be in excess of the current possible to be passed by the bypass module 21 using reasonable components is shown with respect to the waveform graphs shown in FIGS. 8a to 8d relating to the arrangement as shown in FIG. 1. FIG. 8a shows the voltage across the control unit ($V_C$) and FIG. 8b shows the current through the supply module 11 ($I_{CA}$) and operating module 13 ($I_{CB}$). FIG. 8c shows the voltage across the light unit ($V_L$) and FIG. 8d shows the current through the light generating module 23 ($I_L$) and the bypass module 21 ($I_P$).

FIGS. 8a to 8d show for the first interval 801 that the power supply is used to provide power for the control unit 1 but that the control unit 1 current or power usage is in excess of the available current from the light unit 3. FIGS.

8a and 8b for example show the voltage across the control unit 1 ($V_C$) attempting to follow the power supply voltage 305, and a current passing through the supply module 11 ($I_{C4}$). This current passing through the supply module 11 is the current passing through the bypass module 21 ($I_P$) as shown in FIG. 8d. The current is limited in the light unit 3 bypass module 21 and a voltage drop across the light unit 3 occurs ($V_L>0$). The control unit 1 may detect this drop in voltage across the light unit 3. The control module 17 within the control unit may be configured to respond to this detected drop in voltage across the light unit 3. For example the control module 17 may be configured to deactivate or switch off some of the auxiliary modules or control the power mode for the control unit in order to modify the power usage of the at least one auxiliary module 15 such as reducing the display backlight when the transceiver is transmitting. This may be implemented by generating or implementing a new control unit power mode command. Furthermore the control module 17 may be configured to log the event and/or generate a report to be transmitted to a suitable room/building management system to indicate where the current is not sufficient for the control unit and thus propose a system upgrade. The current path capacity of the light unit 3 may be included in information transmitted with the identifier of the light unit 3 via the wireless connection and thus the current path capacity limit monitored by the control unit 1 (and in particular the control module 17 of the control unit).

FIGS. 8a to 8d furthermore show an example where intervals or periods of the power cycle are not used to supply either the control unit or the light unit. Thus for example FIGS. 8a to 8d show a first interval 801 for powering the control unit, a second interval 805 for powering the light unit and a third interval between the first and second intervals used as a gap or buffer period between the first and second intervals.

Figure 9:
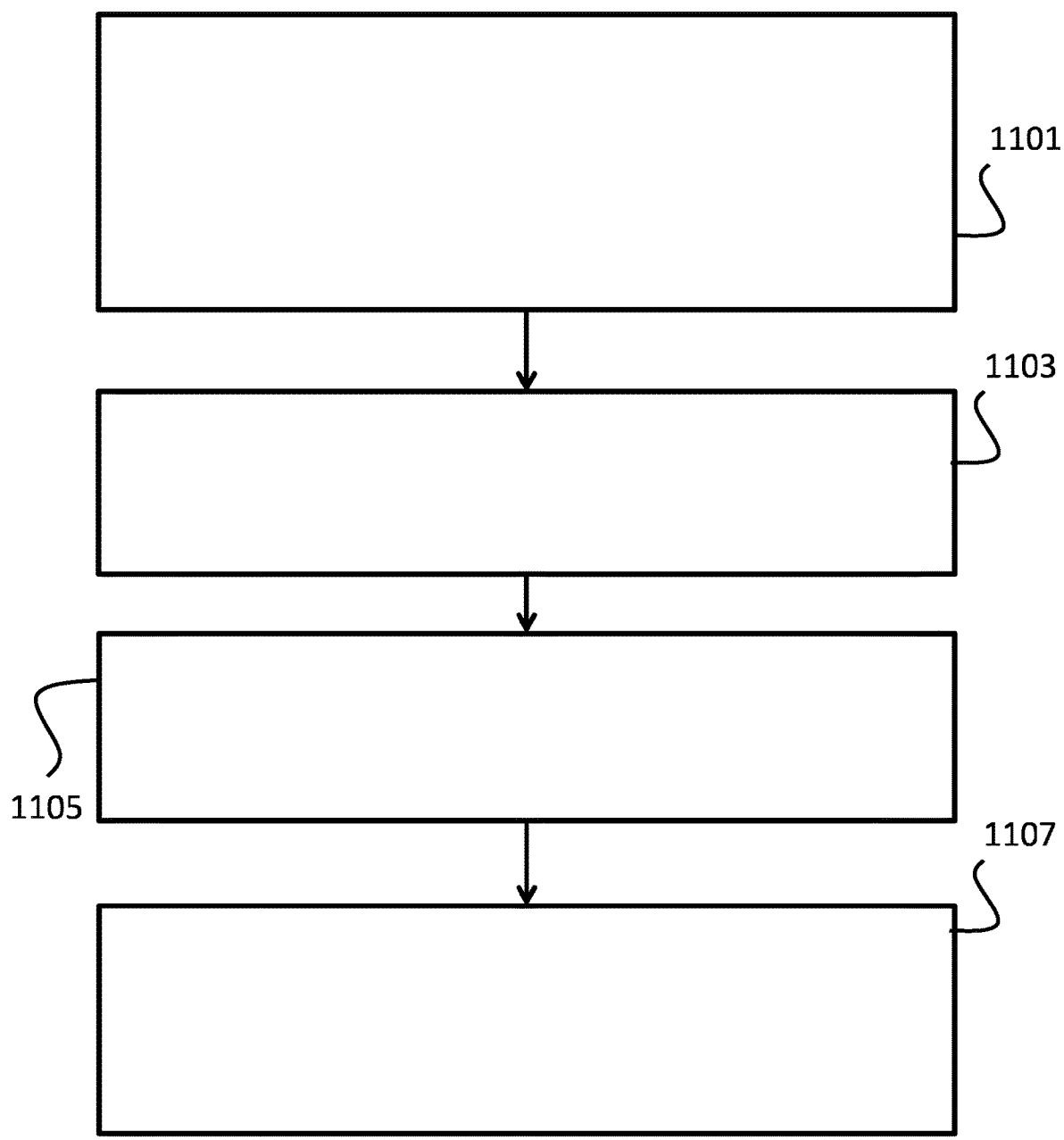
FIG. 9 shows a flow diagram showing an example operation of determining and responding to control unit power or current limits within the lighting system as shown in FIG. 1 according to some embodiments.

With respect to FIG. 9 an example flow chart showing the detection and response to a current limit defined by the light unit 3 is shown.

In this example the control unit 1 initially determines that the control unit 1 is to be operated in a low power or stand-by mode (not implementing any functionality other that waiting for a user input) and that the light unit 3 is to be operated in an off mode (all functionality of the light unit being switched off). The control unit 1 may implement these power modes by splitting the power cycle into at least two intervals.

The operation of determining or splitting the power cycle into at least two intervals is shown in FIG. 9 by step 1101.

For the first interval the input power provided to the control unit 1 is configured to provide the power required to activate the modules to maintain them in standby mode (while the light unit 3 provides a suitable current path for the series arrangement to function).

The operation of performing, for the first interval, supply of power to the control unit 1 and the light unit 3 providing a suitable current path when 'off' is shown in FIG. 9 by step 1103.

The control unit 1 may determine a current limitation. For example the control unit 1 may determine a voltage drop across a light unit 3 or from the light unit information as discussed herein.

The operation of determining a current limit at the control unit 1 is shown in FIG. 9 by step 1105.

The control unit 1 may then be configured to react to the determination of a current limit being lower than the control unit 1 functionality requirements. For example the control unit 1 may be configured to deactivate some of the modules providing auxiliary or integrated functionality, log the event for further analysis or to report the event to a suitable management system as discussed herein.

The operation of the control unit 1 reacting to the determination of the current limit is shown in FIG. 9 by step 1107.

In the embodiments described above the light unit 3 is configured to enter and leave a power mode following receiving a power mode command from the control unit 1. However the light unit 3 may instead be configured to implement a power mode based on a command and leave the power mode without the need to receive a further power mode command. The light unit having implemented the power mode may for example be configured to leave the power mode after a defined time or period, for example a defined number of power cycles. For example the light unit 3 may be configured to implement a very low power standby mode (designated for example in the light unit table as power mode L_PM1). The very low power standby mode can be initiated by a command, such as from the control unit 1 but may revert to a standby mode powering up the transceiver to listen for a next command without receiving an exit or further power mode command. Thus the very low power mode may be implemented by the light unit and not require the light unit to power the transceiver to determine or detect a 'further' command to leave the power mode. The power mode may be realised or implemented within the light unit by a switch which can be set to enable the light unit 3 not to consume any power. After a defined time period or number of cycles the switch can be operated and the light unit 3 and control module 27 re-start communication with the control unit 1. This may be implemented by a depletion mode field effect transistor isolating the control module 27. The gate of the transistor may be loaded with a buffer capacitor and discharge resistor and coupled to the power input for the light unit. The field effect transistor can be set into an initial off voltage when the power mode command is received and the timing constant (RC constant) determines a time period where the switch will re-connect the control module 27.

Figure 10:
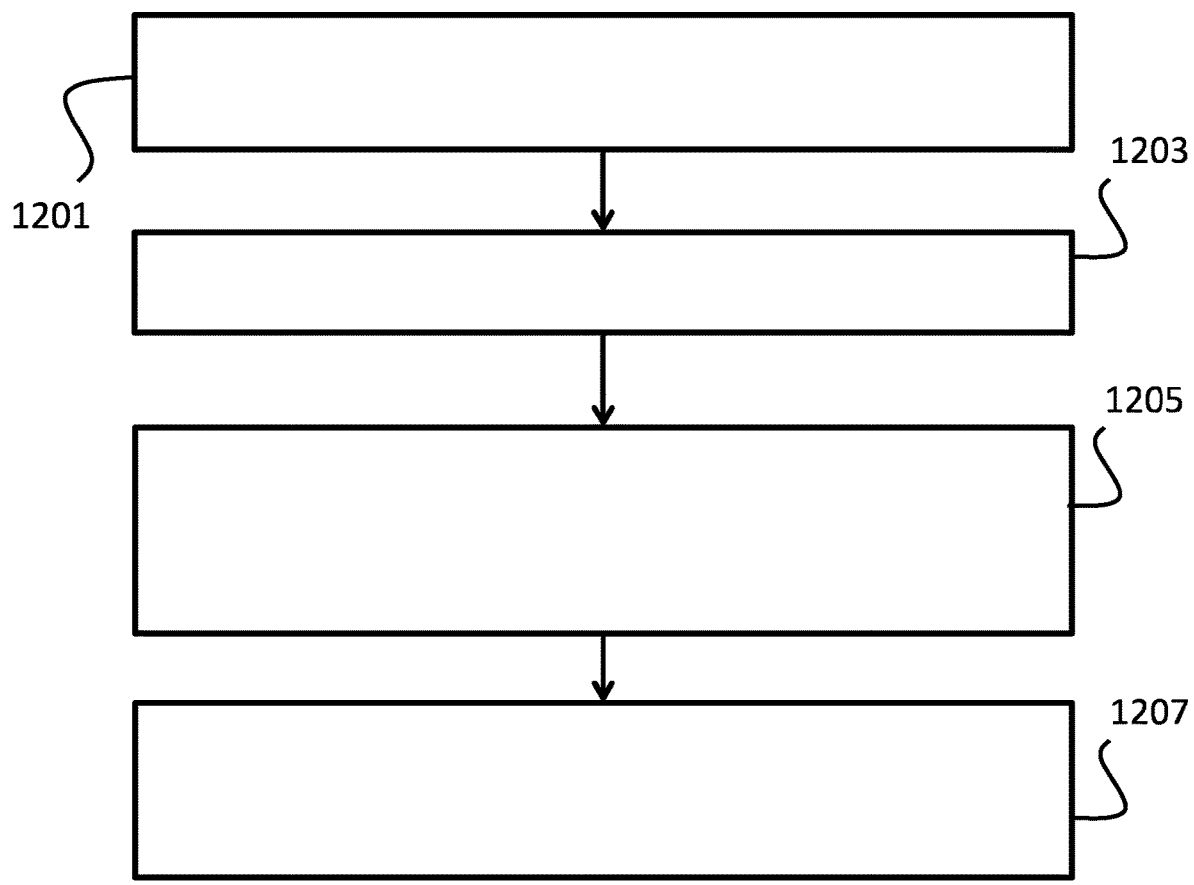
FIG. 10 shows a flow diagram showing an example operation of a timed or low power standby power mode control for the light unit within the lighting system as shown in FIG. 1 according to some embodiments.

The operation of such a system is shown with respect to an example flow diagram FIG. 10.

The control unit 1 may for example transmit to the light unit 3 a power mode command instructing the light unit 3 to operate in a very low power or 'soft-off' mode.

The operation of transmitting a power mode command to the light unit 3 is shown in FIG. 10 by step 1201.

The light unit 3 may receive and implement the command by switching off all modules (or all modules except the bypass module 21) of the light unit. For example by switching a bistable switch controlled by a timer which disconnects the modules to the input power supply.

The operation of receiving the command and entering the 'soft-off' mode is shown in FIG. 10 by step 1203.

The light unit timer at the determined value will expire and power is reconnected to the light unit 3. For example the bistable switch is controlled by a simple capacitor/resistor circuit or a zero-crossing counter, and at the defined time reconnects the light unit modules to the input power supply.

The expiry of the timer is shown in FIG. 10 by step 1205.

The light unit then, at the next power cycle where power is supplied, may power up modules to permit the light unit 3 to listen for further power mode commands from the control unit 1.

The powering up of modules to permit the light unit 3 to listen for further commands is shown in FIG. 10 by step 1207.

The commissioning of a system of controllable light units typically involves employing an investigation or probing of the light units within wireless communication range.

This determines which light units respond to wireless commands from the control unit. However this commissioning method may not indicate which of the light units are able to receive power mode commands over the supply power lines or are in the circuit of the control unit. With respect to FIG. 11 a flow diagram of an example method for commissioning light units within a light system assembly which may be electrically and/or wirelessly connected to the control unit 1 and controlled by power mode commands is described.

The control unit 1 may initially be configured to transmit a wireless (radio frequency) power mode command to light units in wireless range to operate in a full on mode and report themselves to the control unit 1. The control unit 1 thus instructs all of the light units 3 within range of the transceiver of the control unit 1 to be active.

Figure 11:
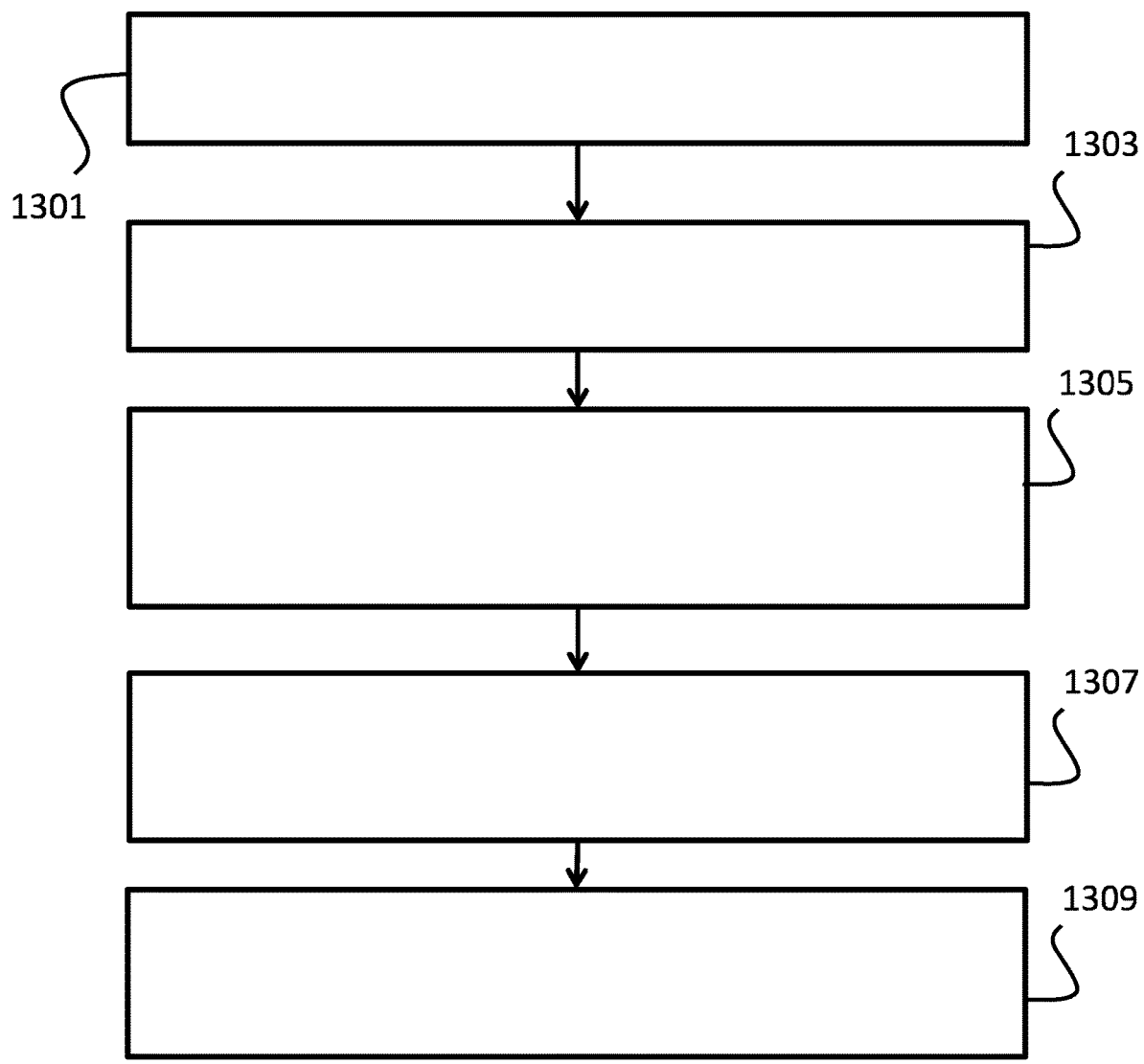
FIG. 11 shows a flow diagram showing an example operation of commissioning the lighting system according to some embodiments.

The operation of generating and transmitting an 'active' power mode command to the light units within wireless connection range is shown in FIG. 11 by step 1301.

The control unit 1 may be then configured to identify and generate a list comprising all of the light units which respond to the command. This defines a first set of light units (set one).

The operation of identifying and generating a list of all of the light units which respond to the power mode command is shown in FIG. 11 by step 1303.

The control unit 1 may be then configured to generate a 'transceiver off' standby or off power mode command and implement passing the command to the light units using the power line. This may for example be implemented by the control unit 1 operating module being controlled to disconnect any serially connected light units from the power supply or to supply them with a voltage below a threshold value as discussed herein. This power mode command may be applied for a determined period only.

The operation of passing a command to the light units within the circuit to switch off their transceivers is shown in FIG. 11 by step 1305.

The control unit 1 may then be configured to identify light units which still respond to wireless commands. For example the control unit 1 may be configured to generate a command to change the light effect of the light unit and which is acknowledged by the light unit. The control unit 1 may then generate a second list of light units which are remain active or are responsive to the further command. This list defines a second set of light units (set two).

The operation of identifying and generating a list of light units which are still responding to wireless commands is shown in FIG. 11 by step 1307.

The control unit 1 may then be configured to identify all of the light units within the circuit available for radio frequency control by determining the difference between the two lists or sets of light units (subtracting the second set of lights units from the first set of light units). This defines a third set of light units which are able to provide a current path for the control unit and furthermore may be controlled. This commissioning may for example be able to determine the maximum available current for the control unit when the light units are in a standby or off mode.

The operation of identifying the third set of light units which are able to provide a current path for the control unit 1 and furthermore may be controlled is shown in FIG. 11 by step 1309.

The term module can be interpreted as including the possibility of a set of interconnected units. For example the supply regulator module may be implemented as a set of interconnected regulator units for selectively supplying electrical power to the control module 17, the at least one controllable auxiliary module 15, and the at least one appliance unit 3.

Although the appliance unit is described in the above examples as a parallel combination of components, the appliance unit can also comprise a fluorescent ballast circuit in series with at least one tubular LED. In such an example the tubular LED can adjust its low impedance path to enable sufficient power to be 'supplied' to the control unit or 2-wire wall-box controller based on the power mode designator. A further example of an appliance unit is a halogen transformer in series with at least one low-voltage halogen spot bulb. Another example of an appliance unit is a ballast circuit in series with a streetlighting LED lamp or a horticulture LED lamp for retrofitting into existing light installations.

Furthermore in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An appliance unit electrically connected in series to a control unit and to a power supply via the control unit, the appliance unit comprising a plurality of modules, including:
   an appliance module comprising at least one controllable light generating module and at least one controllable auxiliary module for performing functionality other than light generating; and
   a control module for negotiating a power mode for the appliance unit with the control unit, the power mode defining which of the at least one controllable light generating module and/or at least one controllable auxiliary module are to be switched on and supplied with power and which of the at least one controllable light generating module and/or at least one controllable auxiliary module are to be switched off and not supplied with power, and controlling the appliance module based on the power mode; and
   a bypass module for passing current through the appliance unit, such that the bypass module is configured to pass a current to enable the control unit to be powered separately from any current passed by the appliance module, wherein the bypass module selectively provides a current path in parallel to the appliance module;
   wherein the at least one controllable auxiliary module comprises a transceiver for wirelessly receiving a power mode command from the control unit for controlling the power mode of the appliance unit, and wherein the control module is configured to selectively switch on the transceiver based on a further power mode command received from the control unit via the series electrical connection.

2. The appliance unit of claim 1, wherein a power supply cycle for the power supply is divided into at least two portions and the bypass module is configured to pass current during a first portion of the power supply cycle and to block current during a second portion of the power supply cycle, the first portion of the power supply cycle for powering of the control unit and the second portion of the power supply cycle for the powering of the appliance unit.

3. The appliance unit of claim 1, wherein the appliance unit is configured to receive wirelessly from the control unit the power mode command comprising a power mode designator, wherein the control module is further configured to control the appliance module based on the received power mode command.

4. The appliance unit of claim 1, wherein the appliance unit is configured to receive from the control unit the power mode command comprising a power supply setting, and adapt the bypass unit accordingly.

5. The appliance unit of claim 1, wherein the appliance unit is configured to receive from the control unit the power mode command comprising the power mode associated with a time period, wherein the control module is configured to control the appliance module based on the power mode for the time period and based on a further power mode following an expiry of the time period.

6. A control unit electrically connected in series with a power supply and at least one appliance unit, the control unit comprising:
   a control module for negotiating a power mode with the at least one appliance unit;
   at least one controllable auxiliary module for performing functionality other than negotiating the power mode;
   a supply regulator module for selectively supplying electrical power to the control module, the at least one controllable auxiliary module, and the at least one appliance unit, such that the supply regulator module is configured to supply current to the at least one appliance unit separately from any current passed by the control module and the at least one controllable auxiliary module, and furthermore wherein the control module is configured to control the at least one controllable auxiliary module and/or the supply regulator module based on the power mode, the power mode defining which of the control module and the at least one controllable auxiliary module to be switched on and supplied with power and which of the control module and the at least one controllable auxiliary module to be switched off and not supplied with power;
   wherein the supply regulator module comprises a supply module controllable by the control module and configured to selectively supply current to the control module and the at least one controllable auxiliary module and an operating module controllable by the control module and configured to selectively supply current to the at least one appliance unit; and
   wherein the operating module selectively provides a current path in parallel to the supply module; and
   wherein the supply regulator module is configured to determine a voltage drop across the at least one appliance unit, and to selectively supply electrical power to the control module and the at least one controllable auxiliary module based on the determined voltage drop across the appliance unit indicating that the current passing through the appliance unit is less than the current required to supply electrical power to the control module and the at least one controllable auxiliary module.

7. The control unit of claim 6, wherein the supply regulator module is configured to divide a power supply cycle for the power supply into at least two portions based on the power mode, the supply module is configured to selectively supply electrical power, from a first portion of the power supply cycle and the operating module is configured to selectively supply electrical power from a second portion of the power supply cycle.

8. The control unit of claim 6, wherein the control module is configured to generate at least one power mode command for negotiating the power mode with the at least one appliance unit, and the at least one controllable auxiliary module comprises a transceiver configured to transmit the at least one power mode command wirelessly to the at least one appliance unit.

9. The control unit of claim 6, wherein the control module is configured to generate at least one power mode command for negotiating the power mode with the at least one appliance unit, wherein the supply regulator module is configured to output the power mode command as a power supply setting to be passed to the appliance unit.

10. A method for controlling an appliance unit in series electrical connection with a control unit and a power supply, the method comprising:

negotiating a power mode with the control unit;

controlling selectively and separately, based on the power mode, the supply of power from the power supply to the appliance unit comprising at least one controllable light generating module and at least one auxiliary module for performing functionality other than generating light;

providing a bypass module for passing current through the appliance unit, such that the bypass module is configured to pass a current to enable the control unit to be powered separately from any current passed by the appliance module, the power mode defining which of the at least one controllable light generating module and/or at least one auxiliary module are to be switched on and supplied with power and which of the at least one controllable light generating module and/or at least one auxiliary module are to be switched off and not supplied with power, wherein the bypass module selectively provides a current path in parallel to the appliance unit; and providing, in the at least one auxiliary module, a transceiver for wirelessly receiving a power mode command from the control unit for controlling the power mode of the appliance unit, and selectively switching on the transceiver based on a further power mode command received from the control unit via the series electrical connection.

11. A method for controlling a control unit for electrical connection in series with a power supply and at least one appliance unit, the method comprising:

negotiating, using a control module, a power mode with the at least one appliance unit; selectively supplying electrical power, using a supply regulator module, based on the power mode, to the control module, to at least one controllable auxiliary module, and to the at least one appliance unit, such that selectively supplying electrical power comprises supplying current to the at least one appliance unit separately from any current passed by the control module and the at least one controllable auxiliary module, the power mode defining which of the control module and the at least one controllable auxiliary module are to be switched on and supplied with power and which of the control module and the at least one controllable auxiliary module are to be switched off and not supplied with power, wherein the supply regulator module includes a supply module controllable by the control module and configured to selectively supply current to the control module and the at least one controllable auxiliary module and an operating module controllable by the control module and configured to selectively supply current to the at least one appliance unit, and wherein the operating module selectively provides a current path in parallel to the supply module; and determining, via the supply regulator module, voltage drop across the at least one appliance unit, and selectively supply electrical power to the control module and the at least one controllable auxiliary module based on the determined voltage drop across the appliance unit indicating that the current passing through the appliance unit is less than the current required to supply electrical power to the control module and the at least one controllable auxiliary module.

* * * * *